United States Patent Office 3,574,765
Patented Apr. 13, 1971

3,574,765
PROCESS FOR DECOLORIZATION OF GLYOXAL
William C. Kuryla, St. Albans, and Jack Jackson, Charleston, W. Va., assignors to Union Carbide Corporation
No Drawing. Filed Aug. 30, 1968, Ser. No. 756,380
Int. Cl. C07c 45/24
U.S. Cl. 260—601    7 Claims

ABSTRACT OF THE DISCLOSURE

A process for reducing color from colored glyoxal solution which comprises contacting colored glyoxal solution with ozone in an amount and for a time sufficient to reduce the color of said glyoxal solution.

---

The present invention relates to glyoxal and more particularly to a process for the decolorization of glyoxal.

Glyoxal, a well known, widely used chemical can be generally represented by the formula:

Glyoxal is most commonly available as a 40% aqueous solution. In this form glyoxal has no appreciable vapor pressure and is not, under atmospheric or vacuum stripping conditions, distillable from water. Aqueous solutions of glyoxal are non-explosive, non-flammable, and, generally stable to storage. As mentioned previously, glyoxal solution is widely used in the industry and its use falls into two general classes (a) those using glyoxal as a reactive chemical intermediate in the preparation of materials such as pharmaceuticals, dyes, polymers, and additives for textile treatment; and (b) those using glyoxal alone to take advantage of its unique reactivity. In the latter application class, glyoxal serves to impart cross-linking to cellulosic and wool fibers, inhibits corrosion, acts as a biologically active compound, and aids in curing rubber. Commonly available 40% aqueous solutions of glyoxal have a green-yellow color. For many of the above uses, the color of the glyoxal solution produces little or no problems. Unfortunately, however, in other use applications, the color of the glyoxal solution impairs the end use of the product. For example, when glyoxal is employed to impart cross-linking to cellulosic and wool fibers such as in the wash and wear area, the presence of the color bodies in the glyoxal solution affects the color of the fabrics particularly the white fabrics. Thus, the advantages derived from the use of glyoxal are sometimes offset by the disadvantages incident to its employment such, as explained previously, in the influence glyoxal solution has in the ultimate color of the product.

It is therefore an object of the present invention to provide a process for the decolorization of glyoxal solution. It is a further object to decolorize glyoxal solution employing ozone as a decolorizing agent which agent does not affect the properties of glyoxal. These and other objects and advantages will be apparent from the following description of the invention.

In an effort to eliminate the color present in 40% glyoxal solutions, we tried treating such solutions with various chemical compounds and mixtures but found no appreciable improvement, i.e., no elimination of the color. In the course of our efforts, strong oxidizing agents were employed as decolorizing agents such as, a 30% hydrogen peroxide solution, peracetic acid, and potassium persulfate. These oxidizing agents failed to reduce the color of glyoxal solutions. In spite of the fact that strong oxidizing failed to reduce the color of glyoxal solutions, we nevertheless tried ozone as a decolorizing agent and found, surprisingly, and contrary to normal expectations, that the ozone effectively decolorized the 40% glyoxal solution at room temperature conditions and more significantly we found that the decolorization of glyoxal solution was accomplished without appreciably attacking the glyoxal itself. We cannot fully understand why ozone, a well known oxidizing agent would be extremely effective for reducing the color of glyoxal solutions without affecting the properties of the glyoxal, while other known oxidizing agents produce no noticeable results. Although we do not wish to be bound by any theory, it is our present belief that the reason why the ozone treatment decolorizes the glyoxal solution without appreciably attacking the glyoxal itself, is due in part, to the fully hydrated character of the carbonyl group. In the case of glyoxal, the 1,2-dialdehydic carbonyls react with water of solution to form 1,1,2,2-tetrahydroxyethane as represented by Formula 1 below and/or various "polymeric" species of 1 below, such as represented by Formulae 2 and 3.

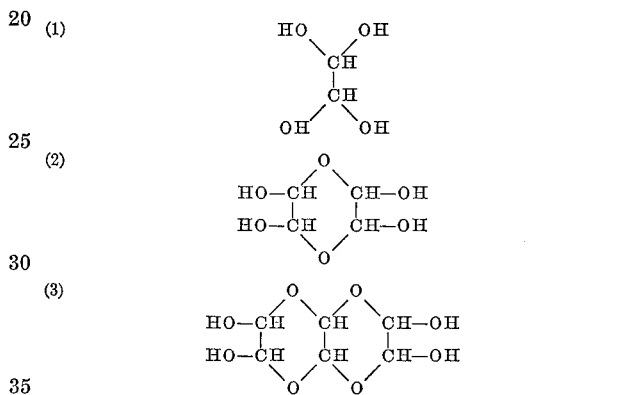

Whatever the theory or phenomenon involved, we found that ozone is an effective decolorizing agent for glyoxal solutions and advantageously the ozone does not attack the glyoxal thereby changing its properties.

Broadly contemplated therefore, there is provided a process for decolorizing colored glyoxal solution which comprises contacting the colored glyoxal solution with ozone in an amount and for a time sufficient to decolorize the glyoxal solution. In a more preferred technique, the above treatment is followed by a filtration procedure whereby the treated glyoxal solution is filtered through activated charcoal to further eliminaate color bodies from the glyoxal solution. Thus, although the ozone treatment provides an effective method for reducing and/or eliminating the color bodies from glyoxal solutions, in certain instances, more effective results can be obtained by following the treatment with the filtration procedure above described. The ozone and glyoxal solution may be brought into contact by any suitable technique. A preferred technique is to simply bubble ozone through the glyoxal solution until the color is eliminated as determined by visual observation. According to this technique, a source of ozone, such as produced in conventional apparatus e.g., a Welsbach ozonator, is bubbled into a container or tank which accommodates a 40% glyoxal solution. As is known, the ozone generated in the ozonator is present in admixture with oxygen and it is not necessary that the oxygen be separated from the ozone prior to contact with the glyoxal solution. The quantity of ozone which is brought into contact with the glyoxal solution depends upon several factors such as variations in gas flow, gas pressure, voltage, temperature and frost point of the gas.

Generally, however, the weight ratio of ozone to glyoxal required to effectively carry out the process of the invention is within the range of about $10^{-7}$ to .1 parts by weight ozone per part by weight glyoxal, preferably $10^{-6}$ to $10^{-3}$.

The contact time can be as little as 0.1 minute to as much as 100 minutes preferably 0.1 minute to 20 minutes. Although contact times over a longer period of time, i.e., in excess of 100 minutes produce satisfactory results, however no advantage is derived from the use of such excess contact time.

Advantageously, the temperatures employed are ambient temperatures although higher or lower temperatures can be employed is desired.

Following the treatment with ozone, the glyoxal solution is thereafter optionally passed through an activated carbon filter in order to further reduce the color of the glyoxal solution. This procedure employs conventional equipment and technique, and hence no detailed description of the procedure appears necessary.

In another illustrative technique for practicing the process of the present invention, the source of ozone is from a solid ozone-silica reagent. The reagent can be prepared via a modification of the procedure described by P. N. Clough and B. A. Thrush in Che., and Ind., Nov. 19, 1966, page 1971.

Briefly, the ozone-silica reagent is prepared by bubbling ozone/oxygen mixture through colorless silica gel contained in a suitable cold trap immersed in a Dry Ice/acetone bath. The ozone/oxygen mixture is absorbed by the colorless silica gel. The silica gel turns blue when the silica gel is saturated with ozone/oxygen mixture.

The ozone-silicone reagent is thereafter introduced into a vessel containing the glyoxal solution to be treated. Operating conditions of temperature, ratios of materials etc., are the same as described previously. The silica reagent can thereafter be removed by a filtration and optionally if desired the glyoxal solution can thereafter be filtered through an activated charcoal filter as previously described. The following examples will illustrate the present invention.

In the examples, color determinations were made on treated and untreated glyoxal solutions.

The color of the glyoxal solution was determined by the method described in ASTM D-1209, which is often referred to in the art as the Pt-Co color standard measurement.

Generally, the Pt-Co color standard of 25 or less indicates a substantially clear solution of glyoxal whereas a color standard of about >25 indicates significant coloration of the solution.

Another technique for determining color is by the so called Gardner color which is described in the test entitled "Paint-Test For Formulated Products And Applied Coatings," ASTM vol. #21 dated January 1968.

EXAMPLE 1

A glyoxal solution containing 39.20% glyoxal by weight having a bright yellow color (Pt-Co color >100 and a Gardner number of about 3) was charged to a 1000 ml. graduated reactor.

Oxygen was fed into a Welsbach ozone generator (ozonator) model T–23 at a feed pressure of 8 lbs./sq. inch. Operating conditions within the ozonator were as follows:

Bath temperature, °C. ----------------------- 10
Voltage, v. --------------------------------- 130
Wattage ------------------------------------ 125

Ozone was generated in the ozonator and the flow rate of oxygen/ozone mixture leaving the ozonator was about 0.03 cu. ft./min.

The ozone was present in the oxygen/ozone mixture in an amount of about 2.95% ozone by volume. The oxygen/ozone mixture was continuously bubbled through the glyoxal solution for about 1 minute at which time the coolr had substantially disappeared from the glyoxal solution.

Color determinations were made on the treated glyoxal solutions and the results are indicated below:

|  | Treatment | |
|---|---|---|
|  | Before | After |
| Pt-Co color | >100 | 40 |
| Gardner number | 3 | <1 |

EXAMPLE 2

The procedure of Example 1 was repeated except that after the ozone treatment, the glyoxal solution was filtered through activated charcoal and thereafter color determinations were made on the filtered glyoxal solution. The results showed a Pt-Co color of 10 for the filtered product.

EXAMPLE 3

The procedure of Example 1 was repeated except that a glyoxal solution containing 40.57 glyoxal by weight was employed which had a Pt-Co color of 60. Color determinations were made and showed a Pt-Co color of 5 for the treated glyoxal solution.

EXAMPLE 4

850 grams of a 40% glyoxal solution having a Pt-Co color of 65 was charged to a 2-liter, 4-neck flask which was equipped with a stirrer, a thermometer, a sparger for the ozone/oxygen mixture feed and an outlet to a wet-test meter to measure the flow of the mixture. Ozone was generated in an ozonator as described in Example 1 under the same operating conditions of Example 1 except that the voltage was 115 v. and the wattage was 135. The generated ozone/oxygen mixture was continuously introduced into the flask in the manner and under the same conditions as described in Example 1. The treated glyoxal solution showed a Pt-Co color after treatment of 10. The treated glyoxal solution was thereafter filtered through activated charcoal and further color determination were made on the filtered glyoxal solution. The results showed a Pt-Co color of 5 for the filtered product.

EXAMPLE 5

The treated glyoxal solution of Example 4 (Pt-Co color of 5) was evaluated as a textile finishing resin. Two finishes were prepared, one containing the treated glyoxal solution and the other untreated glyoxal solution. The untreated glyoxal solution was of the same character and consistency as the treated glyoxal solution prior to treatment. The finish was prepared by charging together into a vessel 145 grams (1 mole) of the 40% glyoxal and 160 grams (2.0 moles) of Formalin. The pH was adjusted to 5.5 with the addition to the admixture of aqueous (15%) sodium acetate. 60 grams (1.0 mole) of urea was then added and this reaction mixture heated for about 2 hours at 60° C. Dilution of the cooled reaction mixture with water to a total weight of 395 grams gave a 45% material which has a pH of 5.4.

A bath was thereafter prepared containing the following ingredients:

25.0% finish of Example 5
4.5% catalyst X–4 (an acetic acid solution of zinc nitrate hexahydrate)
3.0% Mykon SF—a nonionic paraffin-free polyethylene emulsion softening agent
0.1% surfactant (Tergitol 15–S–9– a $C_{11}$ to $C_{15}$ linear chain alcohol-ethylene oxide adduct used as a wetting agent).

Swatches were prepared from a cotton broadcloth and padded in the above bath to a 65 percent wet pick-up using a Butterworth Laboratory Padder.

The padded swatches were then dried for 1.5 minutes at 300° F, and thereafter cured for 15 minutes at 350° F.

The switches were then evaluated for the following properties using the test procedure and equipment indicated.

Wash-Wear AATCC Tentative Test Method 124–1967T Washing Procedure II (Machine, 120° F.). Drying Procedures A and B (Tumble and Line).
Dry Wrinkle Recovery AATCC 66–1969T
Tear Strength ASTM D1424–59 (Elmendorf)
Tensile Strength ASTM D1682 (Grab)
Damage by Retained Chlorine AATCC 114–1965T
Yellowness Measured with Hunterlab Model D–40 Reflectometer for Whiteness.

$$\text{Yellowness} = \frac{\text{Green Reflectance-Blue Reflectance}}{100}$$

0 = a neutral fabric
Increasingly positive numbers indicate increasingly yellow fabric.
Increasingly negative numbers indicate increasingly blue fabric.

The results are indicated in Table 1.

TABLE 1

| | Glyoxal | |
| --- | --- | --- |
| | Treated | Untreated |
| Wash-Wear, T/L | 3.6/3.3 | 3.6/3.4 |
| Wrinkle recovery, W plus F ° | 315 | 316 |
| Tear strength, grams W/F | 250/211 | 208/192 |
| Tensile strength, pounds F | 14 | 15 |
| Damage by retained chlorine, percent | 0 | 0 |
| Yellowness | 0.177 | 0.191 |

EXAMPLE 6

The procedure described in Example 1 was essentially repeated except that a solid ozone-silicone reagent was used as the ozone source. The solid reagent was prepared by charging 226.5 grams of silica gel (obtained from B. Preiser Co.; Grade 01, Mesh 3–8) to a cold trap which was thereafter placed in a Dry Ice/acetone bath. An ozone/oxygen mixture was then passed through at 2.95% ozone concentration. Operating conditions of the ozonator was as indicated in Example 1. After 10 minutes of treatment, the colorless silica gel turned a dark blue color. The ozone/oxygen silica gel was thereafter kept in a Dry Ice/acetone bath until ready for use. 5.0 grams of the ozone/oxygen mixture was absorbed by the silica gel.

To the 1000 ml. reactor, there was added 100.45 grams of 40% glyoxal (Pt-Co>100) solution and the reactor was thereafter placed in an ice-water bath. 560 grams of the ozone/oxygen/silica gel mixture was added to the reactor. Decolorization of the glyoxal solution occurred which was accompanied by a slight foaming. The silica gel was decolorized and settled to the bottom of the reactor, and removed by filtration. Excess ozone/oxygen/silica gel was slowly added to a 5 gallon open-top can containing ice-water and about 600 ml. dimethylethanolamine with stirring to destroy excess ozone.

The treated glyoxal solution was thereafter filtered through activated charcoal.

Color determinations were made and the results are indicated below:

Glyoxal solution: Pt-Co
Before treatment _____ >100
After treatment and filtration _____ 75
After treatment and filtration followed by treatment with activated charcoal _____ 15

EXAMPLE 7

100 grams of a 40% glyoxal solution (Pt-Co >100) was charged to a 1 liter flask equipped with a thermometer. To the solution there was added, dropwise, 1.00 gram hydrogen peroxide (Fischer Scientific, ACS Grade).

The solution was stirred at room temperature. No change in color, or temperature, was observed and there was no apparent reaction. The flask was heated slowly to a temperature of 50° C. and the contents were maintained at this temperature for about 10 minutes. No change in color was observed at this temperature. The flask was heated to 75° C. and held for about 10 minutes at this temperature. No change in color was observed and no reaction was indicated.

EXAMPLE 8

Example 7 was repeated except that 10% peracetic acid solution (1 ml.) was employed in lieu of hydrogen peroxide. The results are indicated below:

Glyoxal solution: Pt-Co
Before treatment _____ >100
After treatment _____ >100

When the amount of 10% peracetic acid was increased to 3 ml. the results obtained were the same.

EXAMPLE 9

Example 7 was repeated except that 0.50 gram of potassium persulfate was employed in lieu of hydrogen peroxide. The results are indicated below:

Glyoxal solution: Pt-Co
Before treatment _____ >100
After treatment _____ >100

As will be evident from the preceding examples, ozone is very effective for reducing the color of glyoxal solutions to acceptable levels whereas other well known oxidizing agents have no effect on the color of glyoxal (Examples 7–9). In addition it can be observed that although ozone is effective for reducing the color of glyoxal solution, optimum results however are achieved when the ozone treated glyoxal solution is further treated by a filtration procedure utilizing an activated charcoal.

While particular embodiments of this invention have been described and shown, it will, of course, be understood that this invention would not be limited thereto since many modifications may be made and all such modifications are within the time, spirit and scope of this invention.

What is claimed is:
1. A process for reducing color from colored glyoxal solution which comprises contacting colored glyoxal solution with ozone in an amount and for a time sufficient to reduce the color of said glyoxal solution.
2. The process of claim 1, further characterized in that the treated glyoxal solution is thereafter filtered through an activated carbon filter.
3. A process according to claim 1 wherein said ozone is employed in an amount of about $10^{-6}$ to .1 part by weight per part by weight of glyoxal.
4. A process according to claim 1 wherein said ozone and said colored glyoxal solution are contacted for a period of at least about 0.1 min.
5. A process according to claim 2 wherein said ozone is employed in an amount of about $10^{-6}$ to $10^{-3}$ parts by weight per part by weight of glyoxal and wherein said ozone and said colored glyoxal solution are contacted for a period of at least about 1 min.
6. A process according to claim 1 wherein the source of said ozone is from an oxygen/ozone gas mixture.
7. A process according to claim 1 wherein the source of said ozone is from a solid ozone/silica material.

References Cited
UNITED STATES PATENTS
3,290,378   12/1966   Tsunemitsu et al. ____ 260—601

BERNARD HELFIN, Primary Examiner

R. H. LILES, Assistant Examiner